Figure 1:
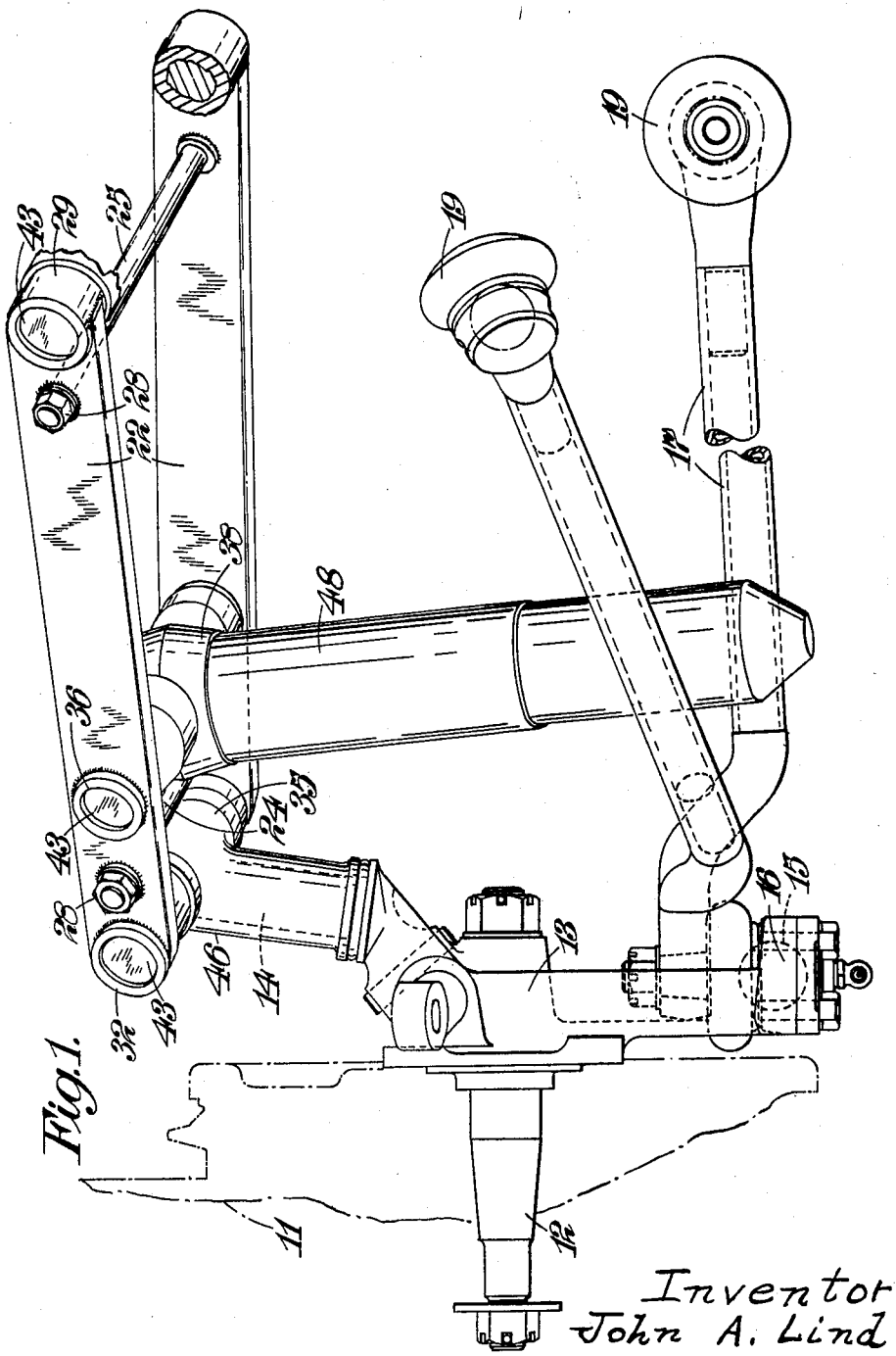

Feb. 14, 1956  J. A. LIND  2,734,753
KNEE-ACTION TYPE WHEEL SUSPENSION WITH
BUILT IN LUBRICATING SYSTEM
Filed Oct. 30, 1952  4 Sheets-Sheet 1

Inventor
John A. Lind
By
Young, Emery & Thompson
Attys.

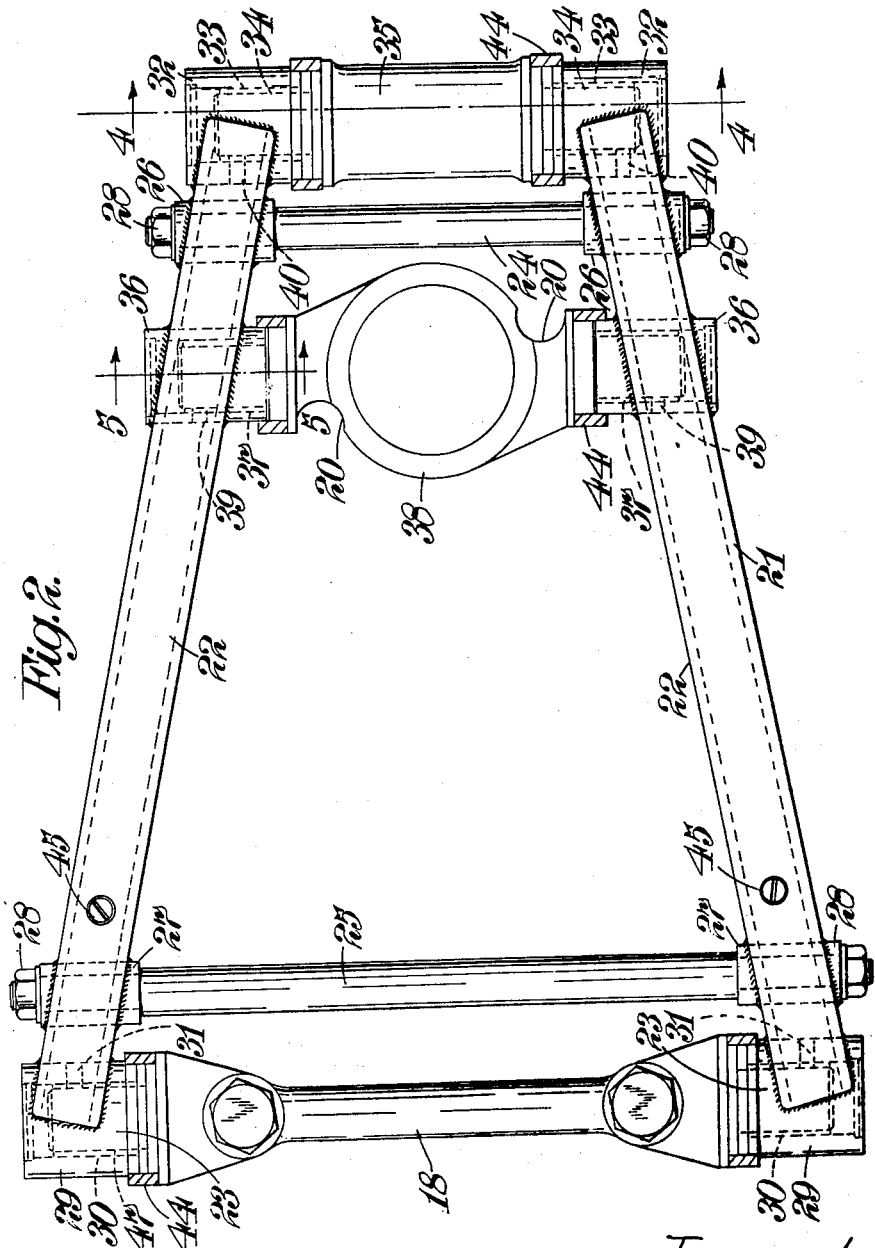

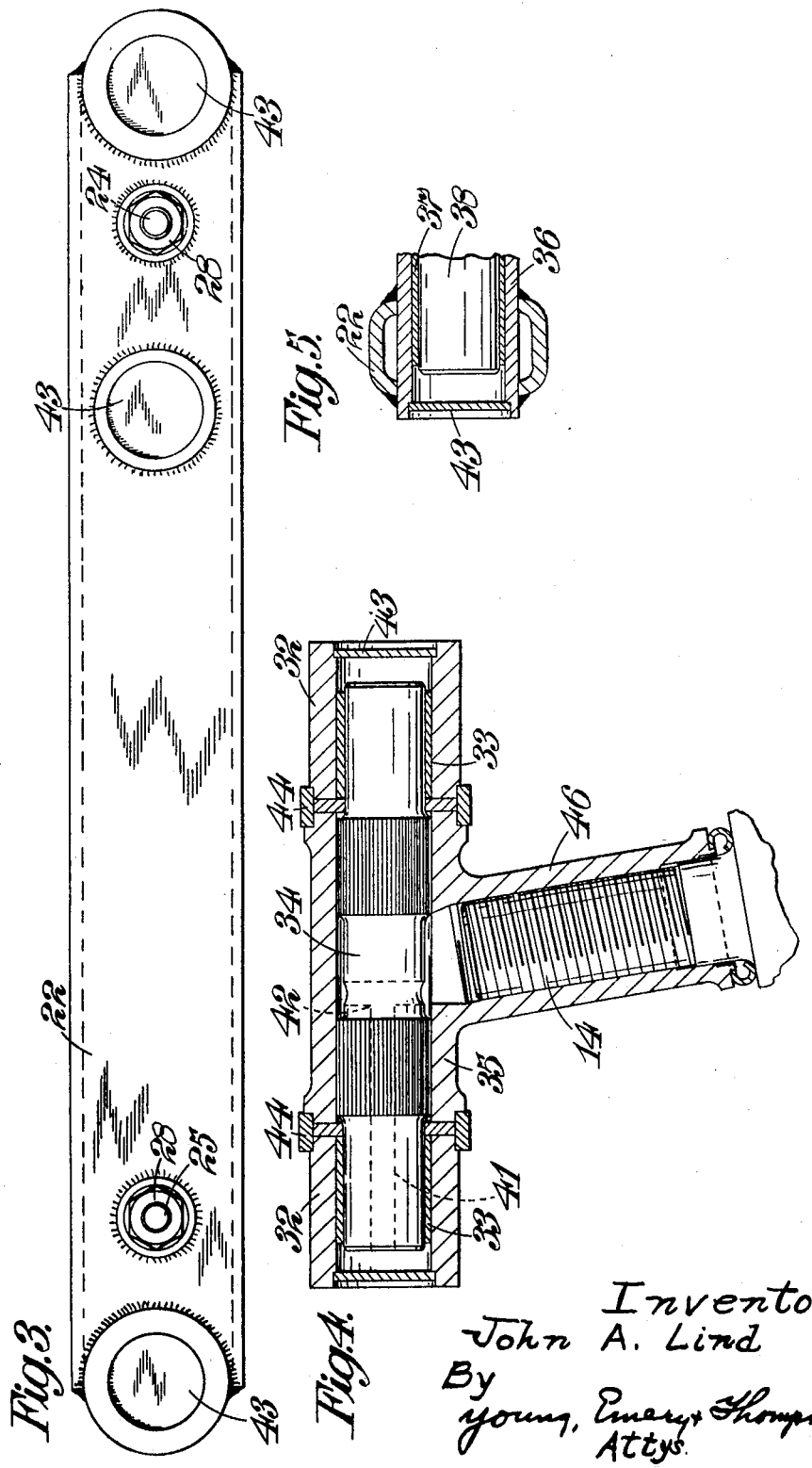

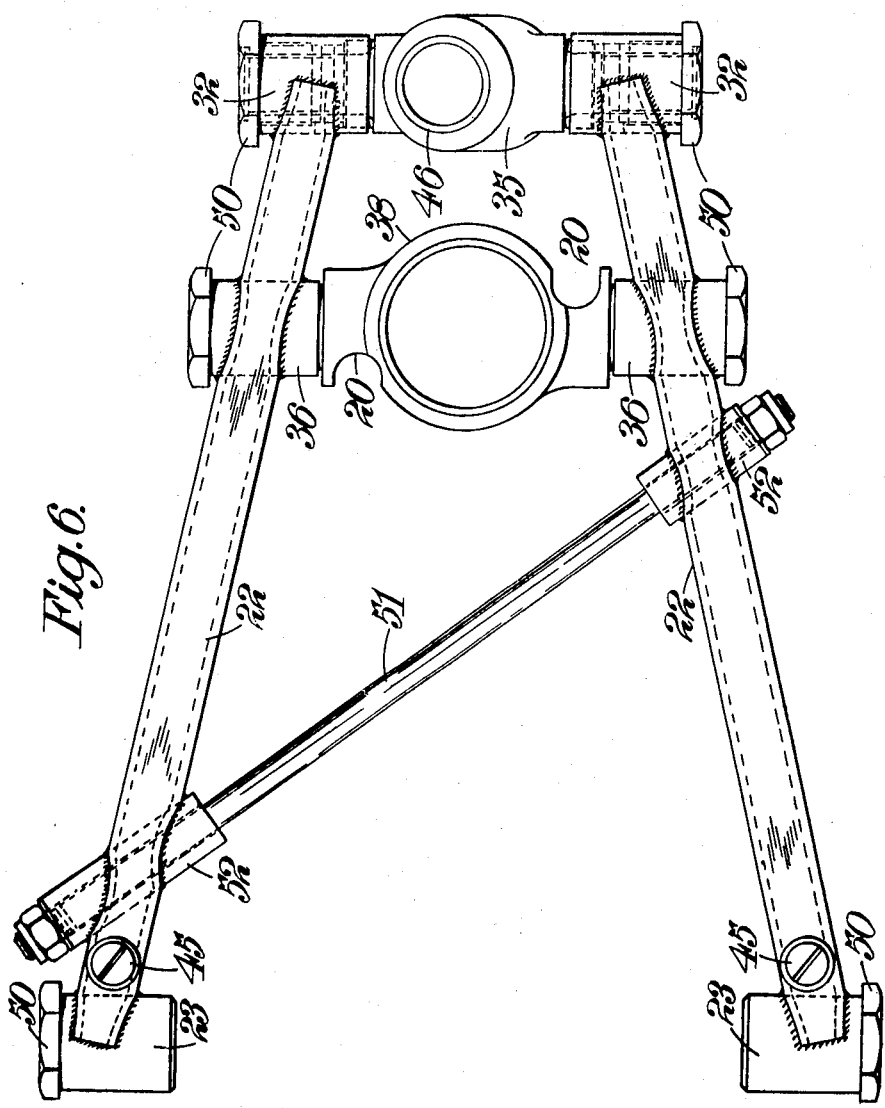

United States Patent Office 2,734,753
Patented Feb. 14, 1956

2,734,753

KNEE-ACTION TYPE WHEEL SUSPENSION WITH BUILT IN LUBRICATING SYSTEM

John Alexander Lind, London, England, assignor to Alford & Alder (Engineers) Limited, Walworth, London, England, a British company Application October 30, 1952, Serial No. 317,623

Claims priority, application Great Britain October 31, 1951

8 Claims. (Cl. 280—96.2)

This invention comprises improvements in or relating to vehicle suspensions.

The invention relates to suspensions of the "wishbone" kind, in which the chassis is supported from each wheel to which the suspension is applied, independently of its support from the other wheels, by a linkwork comprising upper and lower links, one at least of which is a "wishbone," that is to say it consists of two divergent side-members rigidly connected together, each pivoted at one end to a bearing carried by the chassis and at the other end to a member carrying the wheel. This makes four bearings for each wishbone and if the wheel is a steering wheel the bearings of the steering axis are additional; sometimes the springs which transmit the weight of the chassis to the wheels bear on a trunnion which requires additional bearings. The provision of so many bearings makes their lubrication a complicated problem and indeed at each wheel there may be ten or a dozen lubricant nipples. Moreover, the continual oiling of so many points takes an undue amount of trouble.

According to the present invention a "wishbone" for use in a suspension of the type described is made with an oil-reservoir extending longitudinally of one or both side-members, which oil reservoir is connected by appropriate passages to the bearings of the wishbone. Whether the oil-reservoir be nearly full or partly empty, the up and down movement of the suspension which is brought about in the course of travel of the vehicle will throw the oil from one end to the other and ensure a full oil-supply to the bearings, while only one lubrication point is required for the reservoir.

Preferably, the reservoir is provided by making the side-member of the wishbone tubular; if both side-members are tubular, they afford two reservoirs and the oil-passages to the several bearings are simplified.

Where the wishbone supports a king-pin for a steering wheel, it is possible to connect the oil-reservoir to the bearing of the king-pin also; and likewise to trunnion-bearings for the suspension spring. The large amount of lubricant which can thus be carried also makes it necessary to give attention to lubrication only at rare intervals, especially if leakage of oil is guarded against.

The following is a description of one form of suspension in accordance with the invention given by way of example and with reference to the accompanying drawings in which:

Figure 1 is a general elevation of the suspension;
Figure 2 is a plan of the upper wishbone;
Figure 3 is a side elevation of the upper wishbone;
Figure 4 is a section on the line 4—4 of Figure 2;
Figure 5 is a section on the line 5—5 of Figure 2; and
Figure 6 is a plan of an alternative form of upper wishbone.

The construction about to be described is for one front wheel of an automobile having independent front wheel suspension. The wheel has a hub 11 mounted on a steering axle 12, and the axle carries a bracket-member 13 the upper end of which is formed into an inclined screw-threaded king-pin 14. At the lower end of the bracket 13 is a ball 15, co-axial with the king-pin. The king-pin is journalled in a bearing 46 carried by a wishbone 21, and the ball is housed in a socket 16 made in two parts one of which is carried on the lower end of the bracket 13 and the other by a lower wishbone 17. The upper wishbone 21 is pivoted on a bracket 18 (Figure 2) on the chassis of the vehicle so that it extends laterally therefrom. The lower wishbone 17 is pivoted by ball and socket joints parts of which are shown at 19 on the chassis and is somewhat longer than the upper wishbone 21. Spring means (not shown) are supported from the chassis to bear on a trunnion-member 38. The trunnion 38 is journalled in the side-members 22 of the upper wishbone 21. The trunnion 38 extends across the wishbone 21 as close as possible to the bearing 46 for the king pin 14. A shock absorber 48 is also connected to the suspension between the trunnion 38 on the upper wishbone and a fixed bracket below it, projecting from the chassis. The bracket and the spring portion of the suspension are not shown as they are common practice and do not affect the lubrication means, which is the essential feature of this invention.

It will be seen that with this link-work there are seven bearings associated with the upper wishbone 21 and three with the lower wishbone 17.

The upper wishbone 21 (Figures 2–5) is constructed thus: Each side-member consists of a rectangular steel tube 22; the tubes are spaced apart most widely at the bearings 23 on the chassis and converge towards the king-pin 14. They are spaced apart my two cross-struts 24, 25 of mild-steel rod. To secure the structs, short lengths of steel tube 26, 27 (to constitute bosses) are passed through drilled holes, which cross the rectangular steel tubes 22, and the bosses 26, 27 are welded in place in the holes at such an angle that when the side tubes of the wishbone are in their correct relative positions the bosses will line up with each other. The cross-struts 24, 25 are shouldered at the ends and fit the bosses 26, 27 and are held in place by nuts 28 on their ends. The bosses of course cross the interior spaces of the tubes 22 but they are not large enough to stop them up.

At the wider end of the wishbone 21 the ends of the tubular side-members 22 are welded to short pieces of heavy steel tube 29 which constitute hubs. These hubs 29 are large enough to stop-up the ends of the tubular side-members 22 and they contain bearing-bushes 30 which line up with each other and are connected, by oil-passages 31 drilled in the hubs, with the interiors of the side members 22. Pins 47 upon the ends of the chassis-brackets 18 are journalled in the bearing bushels 30.

At the other, that is to say the narrower, end of the wishbone are two similar short heavy pieces of steel tube 32, aligned with each other, which house bearing-bushes 33 for a cross-pin 34. The cross-pin carries, between the bushes, a T-member 35; the head of the T-member 35 is threaded on to the cross-pin 34 and its stem forms the screwthreaded bearing 46 for the king-pin 14.

Close to the cross-strut 24 at this end of the wishbone, there are welded two more short pieces of steel tube 36 which contain bushes 37 providing bearings for the trunnion 38. These pieces of steel tube 36 are not large enough to stop-up the interior of the tubular side-members 22. They are drilled at 39 to afford access of oil from the interior of the side members 22 to the trunnion bearings 37.

The bushes 33 for the cross-pin 34 are also drilled at 40 to afford access of oil to the cross-pin bearings and the cross-pin 34 itself is drilled at 41 and 42 to allow the oil to pass along it to the stem of the T-member 35 and thus to the king-pin bearing 46.

The outer ends of the cross-tubes 29, 32, 36 which carry the various bushes are sealed by spun-in closure plates 43, and the joints where the trunnion, the T-member and the bracket on the chassis which carries the wishbone engage the ends of the bushes are sealed by rubber rings 44 surrounding them.

Each side member 22 of the wishbone 21 has a filler hole 45 for oil and constitutes an oil reservoir. When filled with oil all seven bearings—the two on the bracket on the chassis, the two for the trunnion 38 the two for the cross-pin and the king-pin bearing—are automatically lubricated for long periods without attention.

At the lower part of the suspension, the lower wishbone shown in the drawings has no oil reservoir, but, if desired, it may be of similar construction to the upper wishbone described but of course with no trunnion and only a ball and socket joint for the lower end of the steering-wheel axle bracket, instead of a cross-pin and T-member. Alternatively the lower wishbone may be replaced by radius rods which may also incorporate oil reservoirs.

It will be understood that instead of the suspension described any other wishbone link-work may be adopted without departing from the scope of the invention. For example, the tension rods may be done away with and the spring may bear on the lower wishbone, with or without a trunnion.

In Figure 6, in which parts equivalent to those already described are given like reference numerals, there is shown an alternative form of upper wishbone 21, the general construction of which is similar to that of the upper wishbone shown in Figures 1–5, but in which the spun-in closure plates are replaced by screwed plugs 50, and the two cross-struts by a single strut 51 extending diagonally between the side members 22 with its ends journalled in short pieces of tube 52 welded to the side members in appropriate positions.

I claim:

1. In a vehicle, a suspension comprising a wishbone having two side members, bearings at one end of each side member for pivotal attachment to the vehicle, bearing means at the other end thereof for pivotal attachment to a wheel-carrying element, a hollow reservoir being formed in the interior of one of the side members, and means on the wishbone permitting access to the side member to fill the reservoir therein with oil, said bearings including axially aligned tubular socket portions attached to and closing the ends of the wishbone side members, passages formed in the sockets, said passages being so positioned that they may serve as conduits for fluid flow from the side members into the bearing sockets.

2. A wishbone suspension as claimed in claim 1 comprising two lengths of tube constituting the side-members which are connected by at least one cross-rod and the interior of at least one of which constitutes the reservoir.

3. In a vehicle, a suspension comprising a wishbone having two side members, bearings at one end of each side member for pivotal attachment to the vehicle, bearing means at the other end thereof for pivotal attachment to a wheel-carrying element, a hollow reservoir being formed in the interior of one of the side members with conduits extending from the ends of the reservoir through the interior of the wishbone to the working surfaces of both said bearing means, and means on the wishbone permitting access to the reservoir to fill it with oil, said side members comprising two lengths of tube connected by at least one cross-rod, the interior of at least one of which constitutes the reservoir, each end of the cross-rod fits into a short piece of tube passing transversely through one of the side members and welded thereto, the external depth of the piece of tube being less than the internal depth of the side member so that the piece of tube does not block up the reservoir.

4. In a vehicle, a suspension comprising a wishbone having two side members, bearings at one end of each side member for pivotal attachment to the vehicle, bearing means at the other end thereof for pivotal attachment to a wheel-carrying element, a hollow reservoir being formed in the interior of one of the side members with conduits extending from the ends of the reservoir through the interior of the wishbone to the working surfaces of both said bearing means, and means on the wishbone permitting access to the reservoir to fill it with oil, the bearings on the wishbone are provided by short pieces of tube welded to the ends of the wihbone side members with their axes extending transversly of the side members and passages are formed through the walls of the pieces of tube to permit oil to flow from the reservoir to the bearing surfaces.

5. A vehicle suspension for a steering wheel and as claimed in claim 4, wherein the wheel carrying element is connected at its upper end to an upper wishbone by a screw-threaded bearing connection and at its lower end to a lower wishbone by a ball and socket joint.

6. In a vehicle, a suspension comprising a wishbone having two side members, bearings at one end of each side member for pivotal attachment to the vehicle, bearing means at the other end thereof for pivotal attachment to a wheel-carrying element, a hollow reservoir being formed in the interior of one of the side members with conduits extending from the ends of the reservoir through the interior of the wishbone to the working surfaces of both said bearing means, and means on the wishbone permitting access to the reservoir to fill it with oil, a trunnion is provided on the wishbone to bear the thrust of a suspension spring, each bearing for the trunnion being constituted by a short piece of tube passing transversely through a wishbone side member and welded thereto, the external depth of the piece of tube being less than the internal depth of the side member so that the piece of tube does not block up the side member, and a passage being formed through the wall of the piece of tube to permit oil to flow from the reservoir to the bearing surfaces.

7. A wishbone suspension as claimed in claim 6 wherein the tubular side-members are of substantially rectangular cross-section.

8. A wishbone suspension as claimed in claim 4, including a T-member having a pivotal connection with the wishbone which affords a bearing for a kingpin of a steering wheel axle, passages communicating with the oil reservoir provided in the T-member to permit oil to flow from the reservoir to the kingpin bearing.

References Cited in the file of this patent

UNITED STATES PATENTS

| | | |
|---|---|---|
| 1,912,359 | Bijur | June 6, 1933 |
| 2,027,366 | Bijur | Jan. 14, 1936 |
| 2,179,856 | Leighton | Nov. 14, 1939 |
| 2,558,562 | Hutton | June 26, 1951 |